UNITED STATES PATENT OFFICE.

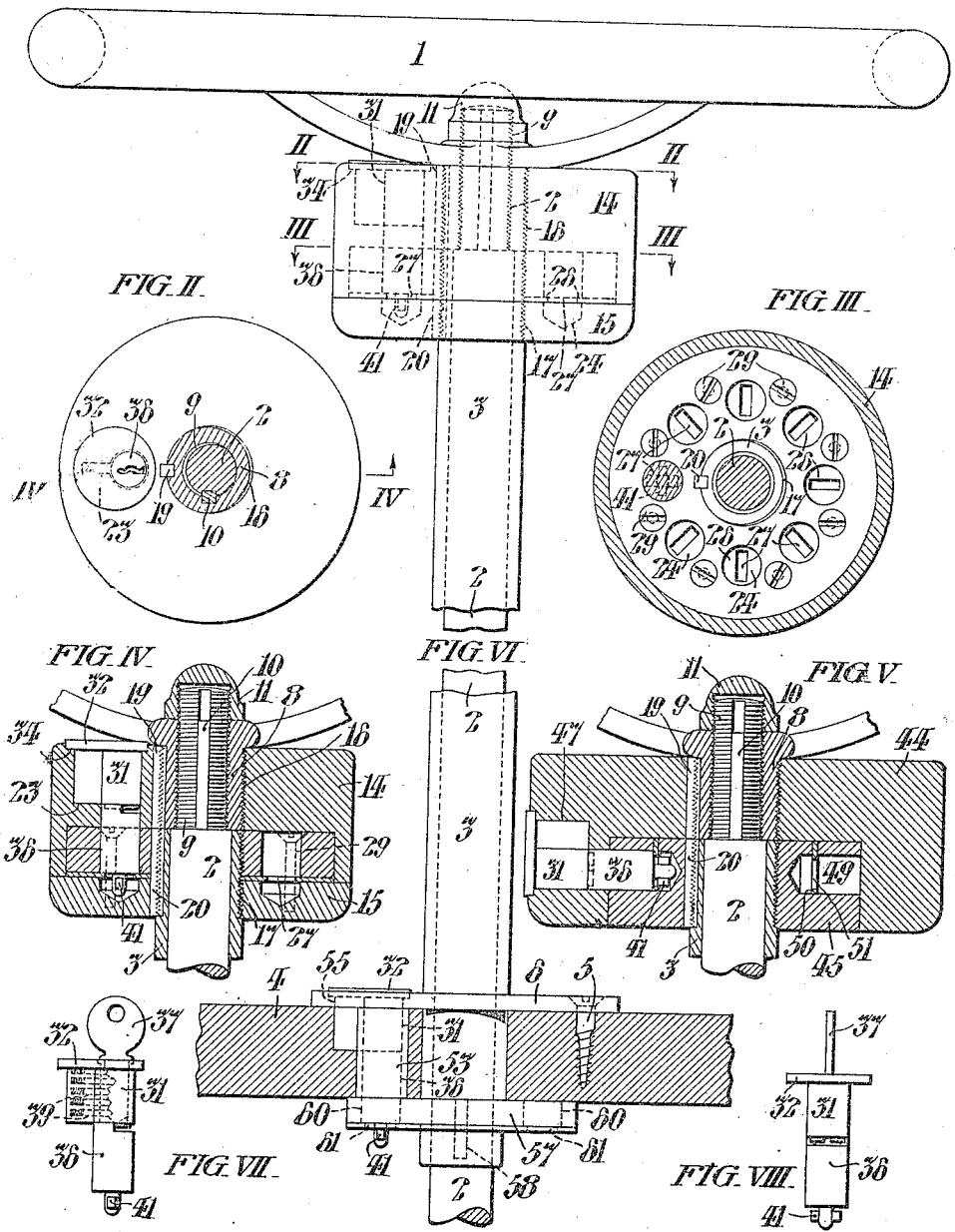

JAMES A. MURPHEY, OF PHILADELPHIA, PENNSYLVANIA, AND FRANK S. THOMPSON, OF ATLANTIC CITY, NEW JERSEY.

AUTOMOBILE-LOCK.

1,156,615.          Specification of Letters Patent.          Patented Oct. 12, 1915.

Application filed March 17, 1915. Serial No. 14,948.

*To all whom it may concern:*

Be it known that we, JAMES A. MURPHEY, a citizen of the United States, residing at Germantown, Philadelphia, in the State of Pennsylvania, and FRANK S. THOMPSON, a citizen of the United States, residing at Atlantic City, in the State of New Jersey, have invented a certain new and useful Improvement in Automobile-Locks, whereof the following is a specification, reference being had to the accompanying drawing.

Our invention relates to locking means for detachably rigidly connecting the steering shaft, or some other normally movable element, of a self propelled vehicle, with the bearing tube inclosing said shaft, or some other stationary portion of the vehicle, so as to prevent the vehicle from being steered when locked; and by turning the front wheels of such a vehicle against a curb or similar obstruction before thus locking it, it is prevented from being towed.

As hereinafter described, our invention includes a lock, preferably of a "Yale" type, which may be portable independently of the vehicle and so small that it may be conveniently carried in the pocket of the operator or owner of the vehicle, but instantly inserted to rigidly connect parts of the vehicle which are ordinarily relatively movable, and which when inserted may be locked in position by turning a key, which key may then be withdrawn, leaving the lock casing interposed in a position to prevent relative movement of said vehicle parts, and in such condition that it cannot be removed except by preliminary manipulation of said key.

As hereinafter described, our invention includes such a portable lock arranged to detachably connect two complementary annular flanged members, one of which is normally movable and the other stationary with respect to the vehicle body. Said movable flange may be rigidly connected with the steering shaft, either by engagement with the hub of the steering wheel or by direct engagement with said shaft remote from said wheel. In the former case, the stationary flange is conveniently mounted in rigid relation with the bearing tube through which the steering shaft extends, and at the top of said tube, but in the latter case, the stationary flange is conveniently mounted at the base of said tube at its junction with the floor of the vehicle.

Our invention includes the various novel features of construction and arrangement hereinafter more definitely specified and claimed.

In the drawings; Figure I is a fragmentary elevation showing the steering wheel of an automobile, the steering shaft which is rigidly connected with said wheel, the bearing tube through which said shaft extends below the vehicle body, and a convenient embodiment of our invention including two annular flanged members respectively rigidly connected with said wheel and with said tube. Fig. II is a plan sectional view, taken on the line II, II in Fig. I, through said steering wheel hub and its shaft, showing a plan view of the upper, normally removable, annular member. Fig. III is a plan sectional view, taken on the line III, III in Fig. I, showing the series of lock bolt sockets in the lower, normally stationary, annular member indicated in Fig. I. Fig. IV is a fragmentary vertical sectional view, taken on the line IV, IV in Fig. II. Fig. V is a fragmentary vertical sectional view, similar to Fig. IV, showing a modified form of our invention; the portable lock being insertible and removable radially with respect to the shaft axis, instead of parallel with the shaft axis as in the form of our invention shown in Fig. IV. Fig. VI is a fragmentary vertical sectional view of the floor of the vehicle body with an elevation of a portion of the steering shaft and its bearing tube, similar to those shown in Fig. I, with an embodiment of our invention arranged to detachably connect a normally movable annular member, carried by said shaft below the floor, with the base flange of said tube. Fig. VII is a side elevation of the portable lock shown in the preceding figures, but containing the key by which its rotary bolt is turned from the locked position, shown in Fig. IV, to the unlocked position shown in Fig. V. Fig. VIII is an elevation of the lock and key shown in Fig. VII, as seen from the right hand side of that figure.

In said figures, the rotary steering wheel 1 of the automobile is normally rigidly connected with the steering shaft 2 which is journaled in the stationary bearing tube 3 which is rigidly connected with the vehicle floor 4, conveniently by screws 5 extending through the base flange 6 on said tube. As indicated in Fig. IV, the hub 8 of said wheel 1 is internally screw threaded to engage the screw threaded end 9 of said shaft 2 which is normally maintained in rigid relation therewith by the key 10 which engages both said hub and shaft and is covered by the cap nut 11. Such construction and arrangement is not essential to our invention but is typical of the ordinary construction of such vehicle elements to which embodiments of our invention may be attached.

As shown in Figs. I to IV inclusive; our invention includes the two complementary annular flange members 14 and 15 respectively screwed upon the hub 8 of said wheel and the adjoining end of said tube 3, by screw threads 16 and 17, and provided with removable keys 19 and 20 normally preventing rotation of said annular members relatively to said hub and tube with which they are respectively connected. Said annular member 14, carried by said wheel hub 8, has an unsymmetrical lock casing socket 23 extending parallel with the axis of said shaft 2, in eccentric relation with the latter, as best shown in Fig. II. The other annular member 15 has a circumferential series of lock bolt sockets 24 with their axes extending parallel with the axis of said shaft 2, as best shown in Fig. III, and arranged to successively register with said casing socket 23 when said wheel 1 is turned. Each of said lock bolt sockets 24 has an undercut annular flange 26 surrounding an opening 27 which is unsymmetrical in relation to the axis of the respective socket, as best shown in Fig. III. As shown in Fig. IV said flanges 26 for the respective sockets 24 are conveniently formed by a single annular plate. Said annular member 15 being conveniently formed of three pieces which are secured in rigid relation by the screws 29, as indicated in Figs. III and IV. Said annular members 14 and 15 are adapted to be detachably connected, in relatively immovable relation, by the portable lock including the casing 31 which is unsymmetrical in cross section and fitted to the socket 23, as indicated in Fig. II, so that it cannot turn in said socket, and has the circular escutcheon 32 which fits in the recess 34 in the annular member 14, as shown in Figs. II and IV, in such position as to cover said socket and prevent the insertion of any implement which might be employed to pry said lock from its locked position in said socket in which it is shown in Figs. II, III and IV. Said lock includes the rotary bolt 36 which is constructed and arranged to fit in any of said bolt sockets 24 in the member 15 and may be turned by the key 37, shown in Figs. VII and VIII. Said bolt 36 is normally maintained stationary in said lock casing 31, by means, including the tumblers 39, controllable by said key. Said bolt 36 has the cross head 41 extending in unsymmetrical relation with its axis, adapted to pass freely through the unsymmetrical openings 27 in said bolt sockets 24 when said bolt is in unlocked position, as indicated in Fig. V; but said head is constructed and arranged to extend transversely with respect to said opening 27 to engage the flange 26 in any of said bolt sockets, when turned by said key 37 to the locked position shown in Figs. III, IV, VII and VIII.

In the form of our invention shown in Fig. V; the annular members 44 and 45 are respectively similar to the annular members 14 and 15 above described, but the lock casing socket 47 in said member 44 extends radially with respect to the axis of the shaft 2, instead of parallel with said axis like the socket 23 above described, and, of course, the lock bolt sockets 49 in said annular member 45 are correspondingly disposed in radial relation to the axis of said shaft 2. In this form of our invention, the annular flanges 50 in the sockets 49 are conveniently formed in a single tubular member which is set, concentrically with the axis of said shaft, in said annular member 45, and has unsymmetrical openings 51 similar to the openings 27 through which the bolt cross head 41 fits as above described.

In the form of our invention shown in Fig. VI; the stationary annular base flange 6 of the bearing tube 3 has the tubular extension 53 in which the lock casing 31 extends through the lock casing socket 55 in said plate 6, which socket is of the unsymmetrical configuration indicated at 23 in Fig. II. The normally movable annular flange member 57 is rigidly connected with said shaft 2, conveniently by the key 58, and has a circumferential series of lock bolt sockets 60, similar to the sockets 24 above described, and shown in Fig. III. Each of said sockets 60 has an annular flange surrounding an opening 61 in unsymmetrical relation with the axis of the respective socket, like the openings 27 shown in Fig. III, and the cross head 41 of said rotary lock bolt 36 coöperates therewith in the manner above described. In this form of our invention, said annular flanges for engaging said lock bolt 36 in the socket 60 are also conveniently formed by a single plate, as in the embodiment of our invention shown in Fig. IV.

Although we have illustrated our invention as directly and indirectly connected with the steering shaft 2; it is to be understood that it may be applied to other suitable normally relatively rotary elements of a vehicle to lock them in relatively immovable relation at the will of the operator. Therefore, we do not desire to limit ourselves to the precise details of construction and arrangement herein set forth, as it is obvious that various modifications may be made in our invention without departing from the essential features thereof as defined in the appended claims.

We claim:—

1. The combination with a rotary steering wheel of an automobile; of a rotary steering shaft rigidly connected with said wheel; a stationary bearing tube in which said shaft is journaled; two annular members respectively screwed upon the hub of said wheel and the adjoining end of said tube; removable means normally preventing rotation of said annular members relatively to the hub and tube with which they are respectively connected; said annular member carried by said wheel hub having an unsymmetrical lock casing socket extending parallel with the axis of said shaft, in eccentric relation with the latter; the other of said annular members having a circumferential series of lock bolt sockets with their axes extending parallel with said shaft axis, arranged to successively register with said casing socket when said wheel is turned; each of said lock bolt sockets having an undercut annular flange surrounding an opening which is unsymmetrical in relation to the axis of the respective socket; a key lock, portable independently of said members, including a casing removably fitted to said casing socket, so that it cannot turn therein, a rotary bolt which is fitted to any of said bolt sockets and may be turned by the key of said lock, means, controllable by said key, normally maintaining said bolt stationary in said lock casing, and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

2. The combination with a rotary steering wheel of an automobile; of a rotary steering shaft operatively connected with said wheel; a stationary bearing tube in which said shaft is journaled; two annular members respectively rigidly connected with said wheel and the adjoining end of said tube; said annular member connected with said wheel having an unsymmetrical lock casing socket extending parallel with the axis of said shaft, in eccentric relation with the latter; the other of said annular members having a circumferential series of lock bolt sockets with their axes extending parallel with said shaft axis, arranged to successively register with said casing socket when said wheel is turned; each of said lock bolt sockets having an undercut annular flange surrounding an opening which is unsymmetrical in relation to the axis of the respective socket; a key lock, portable independently of said members, including a casing removably fitted to said casing socket, so that it cannot turn therein, a rotary bolt which is fitted to any of said bolt sockets and may be turned by the key of said lock, means, controllable by said key, normally maintaining said bolt stationary in said lock casing, and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

3. The combination with a rotary steering wheel of an automobile; of a rotary steering shaft operatively connected with said wheel; a stationary bearing tube in which said shaft is journaled; two annular members respectively rigidly connected with said wheel and said tube; said annular member connected with said wheel having a lock casing socket; the other of said annular members having a series of lock bolt sockets, arranged to successively register with said casing socket when said wheel is turned; each of said lock bolt sockets having an undercut annular flange surrounding an opening which is unsymmetrical in relation to the axis of the respective socket; a key lock, portable independently of said members, including a casing removably fitted to said casing socket, so that it cannot turn therein, a rotary bolt which is fitted to any of said bolt sockets and may be turned by the key of said lock, means, controllable by said key, normally maintaining said bolt stationary in said lock casing, and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

4. The combination with a rotary steering wheel of an automobile; of a rotary steering shaft operatively connected with said wheel; a stationary bearing tube in which said shaft is journaled; two annular members respectively rigidly connected with said wheel and said tube; said annular member connected with said wheel having a lock casing socket; the other of said annular members having a series of lock bolt sockets, arranged to successively register with said casing socket when said wheel is turned; each of said lock bolt sockets having an undercut opening; a key lock, portable independently of said members, including a casing fitted to said casing socket, so that it cannot turn therein, and a rotary bolt which is fitted to any of said bolt sockets and may be turned by said key, means, controllable by said key, mally maintaining said bolt stationary in said lock casing; and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

5. The combination with a rotary steering wheel of an automobile; of a rotary steering shaft operatively connected with said wheel; a stationary bearing tube in which said shaft is journaled; two annular members respectively rigidly connected with said wheel and said tube; said annular member connected with said wheel having a lock casing socket; the other of said annular members having a series of lock bolt sockets, arranged to successively register with said casing socket when said wheel is turned; each of said lock bolt sockets having an undercut opening; a key lock including a casing fitted to said casing socket, so that it cannot turn therein, and a rotary bolt which is fitted to any of said bolt sockets and may be turned by the key of said lock, means, controllable by said key, normally maintaining said bolt stationary in said lock casing; and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

6. The combination with a rotary steering wheel of an automobile; of a rotary shaft operatively connected with said wheel; a stationary support; two annular members respectively rigidly connected with said shaft and said support; said annular member connected with said shaft having a lock casing socket; the other of said annular members having a series of lock bolt sockets, arranged to successively register with said casing socket when said wheel is turned; each of said lock bolt sockets having an undercut annular flange surrounding an opening which is unsymmetrical in relation to the axis of the respective socket; a key lock, portable independently of said members, including a casing removably fitted to said casing socket, so that it cannot turn therein, a rotary bolt which is fitted to any of said bolt sockets and may be turned by the key of said lock, means, controllable by said key, normally maintaining said bolt stationary in said lock casing, and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

7. The combination with a rotary steering wheel of an automobile, of a rotary shaft operatively connected with said wheel; a stationary support; two annular members respectively rigidly connected with said shaft and said support; said annular member connected with said shaft having a lock casing socket; the other of said annular members having a series of lock bolt sockets, arranged to successively register with said casing socket when said wheel is turned; each of said lock bolt sockets having an undercut opening; a key lock, portable independently of said members, including a casing fitted to said casing socket, so that it cannot turn therein, and a rotary bolt which is fitted to any of said bolt sockets and may be turned by the key of said lock, means, controllable by said key, normally maintaining said bolt stationary in said lock casing; and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

8. The combination with a rotary steering wheel of an automobile; of a rotary shaft operatively connected with said wheel; a stationary support; two annular members respectively rigidly connected with said shaft and said support; said annular member connected with said shaft having a lock casing socket; the other of said annular members having a series of lock bolt sockets, arranged to successively register with said casing socket when said wheel is turned; each of said lock bolt sockets having an undercut opening; a key lock including a casing fitted to said casing socket, so that it cannot turn therein, and a rotary bolt which is fitted to any of said bolt sockets and may be turned by the key of said lock, means, controllable by said key, normally maintaining said bolt stationary in said lock casing; and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

9. The combination with a rotary steering wheel of an automobile; of a rotary steering shaft engaged by said wheel; a stationary bearing tube in which said shaft is journaled; two annular members respectively screwed upon the hub of said wheel and the adjoining end of said tube; removable means normally preventing rotation of said annular members relatively to the hub and tube with which they are respectively connected; said annular member carried by said wheel hub having a lock casing socket extending parallel with the axis of said shaft, in eccentric relation with the latter; the other of said annular members having a circumferential series of undercut lock bolt sockets arranged to successively register with said casing socket when said wheel is turned; a key lock, portable independently of said members, including a casing fitted to said casing socket, so that it cannot turn therein, and a bolt which is fitted to any of said bolt sockets and may be set by said key to prevent removal of said lock and relative rotation of said annular members.

10. The combination with a rotary steering wheel of an automobile; of a rotary steering shaft operatively connected with said wheel; a stationary bearing tube in which said shaft is journaled; two annular members respectively rigidly connected with said wheel and the adjoining end of said tube; said annular member connected with said wheel having a lock casing socket extending parallel with the axis of said shaft, in eccentric relation with the latter; the other of said annular members having a circumferential series of lock bolt sockets arranged to successively register with said casing socket when said wheel is turned; a key lock, portable independently of said members, including a casing fitted to said casing socket, so that it cannot turn therein, and a bolt which is fitted to any of said bolt sockets and may be set by the key of said lock to prevent removal of said lock and relative rotation of said annular members.

11. The combination with a rotary steering wheel of an automobile; of a rotary steering shaft operatively connected with said wheel; a stationary bearing tube in which said shaft is journaled; two annular members respectively rigidly connected with said wheel and said tube; said annular member connected with said wheel having an unsymmetrical lock casing socket; the other of said annular members having a series of lock bolt sockets arranged to successively register with said casing socket when said wheel is turned; a key lock, portable independently of said members, including a casing fitted to said casing socket, so that it cannot turn therein, and a bolt which is fitted to any of said bolt sockets and may be set by the key of said lock to prevent removal of said lock and relative rotation of said annular members.

12. The combination with a normally rotary element and a stationary element of an automobile; of two annular members respectively rigidly connected with said elements; said annular member connected with said rotary element having a lock casing socket; the other of said annular members having a series of lock bolt sockets, arranged to successively register with said casing socket when said rotary member is turned; each of said lock bolt sockets having an undercut annular flange surrounding an opening which is unsymmetrical in relation to the axis of the respective socket; a key lock, portable independently of said members, including a casing removably fitted to said casing socket, so that it cannot turn therein, a rotary bolt which is fitted to any of said bolt sockets and may be turned by said key, means, controllable by the key of said lock, normally maintaining said bolt stationary in said lock casing, and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

13. The combination with a normally rotary element and a stationary element of an automobile; of two annular members respectively rigidly connected with said elements; said annular member connected with said rotary element having a lock casing socket; the other of said annular members having a series of lock bolt sockets, arranged to successively register with said casing socket when said rotary member is turned; each of said lock bolt sockets having an undercut opening; a key lock, portable independently of said members, including a casing fitted to said casing socket, so that it cannot turn therein, and a rotary bolt which is fitted to any of said bolt sockets and may be turned by said key, means, controllable by the key of said lock, normally maintaining said bolt stationary in said lock casing; and a head on said bolt extending in unsymmetrical relation with its axis, adapted to pass freely through the unsymmetrical opening in any of said bolt sockets when said bolt is in unlocked position; said head being constructed and arranged to engage the flange in any of said bolt sockets when turned to locked position by said key.

14. The combination with a normally rotary element and a stationary element of an automobile; of two annular members respectively rigidly connected with said elements; said annular member connected with said rotary element having a lock casing socket; the other of said annular members having a series of lock bolt sockets, arranged to successively register with said casing socket when said rotary member is turned; each of said lock bolt sockets having an undercut opening; a key lock including a casing fitted to said casing socket, so that it cannot turn therein, and a rotary bolt which is fitted to any of said bolt sockets and may be turned by said key, means, controllable by said key, normally maintaining said bolt stationary in said lock casing; and a head on said bolt, adapted to pass freely through the opening in any of said bolt sockets when said bolt is in unlocked position; said head being constructed and arranged to engage the flange in any of said bolt sockets when turned to locked position by said key.

15. The combination with a normally rotary element and a stationary element of an automobile; of two annular members respectively rigidly connected with said elements; said annular member connected with said rotary element having a lock casing socket; the other of said annular members having a circumferential series of undercut lock bolt sockets arranged to successively register with said casing socket when said rotary member is turned; a key lock portable independently of said members, including a casing fitted to said casing socket, so that it cannot turn therein; and a bolt which is fitted to any of said bolt sockets and may be set by the key of said lock to prevent removal of said lock and relative rotation of said annular members.

16. The combination with a normally rotary element and a stationary element of a motor vehicle; of two members respectively rigidly connected with said elements; said member connected with said rotary element having a lock casing socket; the other of said members having a series of lock bolt sockets arranged to successively register with said casing socket when said rotary member is turned; a key lock including a casing fitted to said casing socket and a bolt which is fitted to any of said bolt sockets and may be set by the key of said lock to prevent disengagement of said lock and relative rotation of said members.

17. The combination with a normally rotary element and a relatively stationary element of a self propelled vehicle; of two complementary members respectively rigidly connected with said elements; one of said members having a lock casing socket; the other of said members having a series of lock bolt sockets, arranged to successively register with said casing socket when said members are relatively turned; a lock, portable independently of said members, including a casing removably fitted to said casing socket, so that it cannot turn therein, a rotary bolt which is fitted to any of said bolt sockets and may be turned by manipulation of said lock, and a head on said bolt adapted to pass freely in and out of any of said bolt sockets when said bolt is in unlocked position; said head being constructed and arranged to engage any of said bolt sockets, and prevent relative rotation of said members, when turned to locked position.

18. The combination with a normally rotary element and a relatively stationary element of a self propelled vehicle; of two complementary members respectively rigidly connected with said elements; one of said members having a lock casing socket; the other of said members having a series of lock bolt sockets arranged to successively register with said casing socket when said members are relatively turned; a lock, including a casing fitted to said casing socket, so that it cannot turn therein, a rotary bolt which is fitted to any of said bolt sockets and may be turned by manipulation of said lock, and a head on said bolt adapted to pass freely in and out of any of said bolt sockets when said bolt is in unlocked position; said head being constructed and arranged to engage any of said bolt sockets, and prevent relative rotation of said members, when turned to locked position.

19. The combination with a rotary steering wheel of a motor vehicle; of a rotary steering shaft operatively connected with said wheel; a stationary bearing in which said shaft is journaled; two members respectively rigidly connected with said wheel and said bearing; said member connected with said wheel having a lock casing socket; the other of said members having a series of lock bolt sockets arranged to successively register with said casing socket when said wheel is turned; a key lock, portable independently of said members, including a casing fitted to said casing socket, so that it cannot turn therein, and a bolt which is fitted to any of said bolt sockets and may be set by the key of said lock to prevent removal of said lock and relative rotation of said members.

20. The combination with a rotary steering wheel of a motor vehicle; of a rotary steering shaft operatively connected with said wheel; a stationary bearing in which said shaft is journaled; two members respectively rigidly connected with said wheel and said bearing; said member connected with said wheel having a lock casing socket; the other of said members having a series of lock bolt sockets arranged to successively register with said casing socket when said wheel is turned; a key lock, fitted to said casing socket and having a bolt which is fitted to any of said bolt sockets and may be set by the key of said lock to prevent said vehicle from being steered.

21. The combination with a normally rotary element and a stationary element of a motor vehicle; of two members respectively connected with said elements; said member connected with said rotary element having a lock casing socket; the other of said members having a series of lock bolt sockets arranged to successively register with said casing socket when said rotary member is turned; a lock fitted to said casing socket and having a bolt which is fitted to any of said bolt sockets and may be set to prevent disengagement of said lock and relative rotation of said members, when locked.

In testimony whereof, we have hereunto signed our names at Philadelphia, Pennsylvania, this sixth day of March, 1915.

JAMES A. MURPHEY.
FRANK S. THOMPSON.

Witnesses:
G. E. MURPHEY,
WM. J. LITTEL.